(12) United States Patent
Hishinuma

(10) Patent No.: US 7,431,149 B2
(45) Date of Patent: Oct. 7, 2008

(54) BELT JUNCTION CONVEYOR

(75) Inventor: Nobuya Hishinuma, Yokohama (JP)

(73) Assignee: Sanki Engineering Co., Ltd., Tokyo (JP)

( * ) Notice: Subject to any disclaimer, the term of this patent is extended or adjusted under 35 U.S.C. 154(b) by 750 days.

(21) Appl. No.: 11/080,310

(22) Filed: Mar. 15, 2005

(65) Prior Publication Data

US 2005/0205392 A1    Sep. 22, 2005

(30) Foreign Application Priority Data

Mar. 17, 2004    (JP) .............................. P2004-076745

(51) Int. Cl.
    *B65G 21/16*    (2006.01)
(52) U.S. Cl. ...................... 198/831; 198/837
(58) Field of Classification Search ................ 198/831, 198/837, 835, 806, 861.1
    See application file for complete search history.

(56) References Cited

U.S. PATENT DOCUMENTS

| | | | |
|---|---|---|---|
| 4,024,949 A | 5/1977 | Kleysteuber et al. | |
| 5,358,260 A | 10/1994 | Ogata et al. | |
| 6,662,937 B2 * | 12/2003 | Warnecke | 198/831 |
| 6,962,252 B2 * | 11/2005 | Fujiwara et al. | 198/837 |
| 7,249,673 B2 * | 7/2007 | Axmann | 198/831 |
| 2004/0035685 A1 * | 2/2004 | Fujiwara et al. | 198/831 |

FOREIGN PATENT DOCUMENTS

| | | |
|---|---|---|
| DE | 1 720 187 | 4/1956 |
| DE | 26 36 160 | 3/1977 |
| DE | 42 28 121 | 3/1994 |
| JP | 3-28006 | 6/1991 |
| JP | 3-30328 | 6/1991 |
| JP | 4-32331 | 8/1992 |
| JP | 7-98563 | 10/1995 |
| JP | 2507835 | 5/1996 |
| JP | 08133438 | 5/1996 |
| JP | 11-278654 | 10/1999 |
| JP | 2004-256201 | 9/2004 |

* cited by examiner

*Primary Examiner*—James R Bidwell
(74) *Attorney, Agent, or Firm*—Michael J. Striker (57) ABSTRACT

A belt junction belt conveyor in which a thick periphery edge of a belt is elastically held after the belt is rewound by upper and lower inclined pulleys so that the meandering tendency of the belt occurring from being rewound by the upper and lower inclined pulleys is effectively prevented.

4 Claims, 8 Drawing Sheets

BELT JUNCTION CONVEYOR

BACKGROUND OF THE INVENTION

1. Field of the Invention

The present invention relates to a conveyor used for converging carrier object to a conveyor line, and more particularly, to a belt junction conveyor in which a returning belt is prevented from moving toward the direction of a bias angle due to inclined pulleys mounted on an upper side and a lower side.

2. Prior Art

A belt junction conveyor (converging conveyor) provided at a confluence of a transportation line is disposed to a conveyor line obliquely (45 degrees), and a rewinding part (or a returning part) of a converging side belt is mounted on the disposed part. In a known prior art, a belt is advanced by providing the upper side and the lower side of a rewinding part with a guide body made of aluminum sheet (for example, Patent Document 1). In another prior art, in order to prevent a belt from meandering, a sliding strip is employed (for example, Patent Documents 2 and 3). Or, in another prior art, a narrow belt type allows a belt to travel by bending it vertically at the rewinding part without applying torsion so as to prevent the meandering of a belt.

When a non-rotator such as upper and lower guide bodies, sliding strip, or a fixed pipe as described above is used in such a manner to rewind a belt to change its traveling direction, the travel load of a belt becomes extremely large due to slide toward such a non-rotator, thus requires a mass capacity motor. As an upstream belt rewound in an inclined manner at a rewinding part constantly advances in the traveling direction, the belt may gradually slide toward a position with less resistance along with the inclination of the rewinding part to meander, or be removed. Furthermore, once a belt position or tension has been adjusted, as a slight deviation of a belt position can cause removal or meandering of a belt again, adjustment requires proficiency. As previously mentioned, employment of a narrow belt type can prevent meandering in such a way to bend vertically at the rewinding part However, as pluralities of belts are used in such a mechanism, the system becomes complicated. In order to improve those problems, there is provided a pair of inclined rollers having an engaging concave and a stopper on both sides of a belt (for example Patent Document 4). In another prior art, the use of an inclined roller in the form of a split roller is proposed (for example, Patent Document 5).

(List of Patent Documents)

1. UM Publication No. 3-28006 (page 3, right column, line 26 to page 4, left column, line 6; FIGS. 1 and 2)
2. UM Publication No. 3-30328 (page 1, left column, lines 1-10; FIGS. 1 to 3)
3. UM Publication NO. 4-32331 (page 2, left column, line 35 to right column, line 33; FIGS. 1 and 2)
4. UM Registration No. 2507835 (page 3, left column, line 25 to right column, line 26; FIGS. 1 to 5)
5. Patent Publication No. 7-98563 (page 4, left column, line 33 to page 5, right column, line 31; FIG. 1)

SUMMARY OF THE INVENTION

The change of direction by merely rewinding a belt by a split roller will allow the roller to cause rolling friction, which reduces the running resistance compared with the sliding friction of a non-rotator. However, a traveling belt will slide toward a position having less resistance along with the incli-nation of a rewinding part, which increases the possibility of belt removal or meandering. Furthermore, if a pair of upper and lower inclined rollers are used in such a manner that an engaging concave is provided on rollers and a stopper is provided on both sides of a belt, the belt stopper comes in contact with the inclined rollers slantingly, which causes the engaging concave at the roller side to become a wide groove. Therefore, because of the degree of freedom of the stopper movement, the effectiveness of aimed meandering prevention is small.

Then, it is expected to provide a system in which junction reminding part is formed as a rotator (upper and lower inclined pulleys) so that running load is reduced, as well as the decrease of motor capacity, vibration, and noise are suppressed. In addition, in such a system, a belt meandering, which is easily capable of happening at a rewinding part in an inclined roller system, is suppressed, and maintenance workability is greatly improved.

The object of the invention is to provide a belt junction conveyor comprising a holder unit which is elastically holding a profile (semicircular convex or a thick edge part having a round shape) of a belt arranged in proximity to an edge of a traveling belt to suppress remaining tendency of direct advance of the belt when it is rewound by the upper and lower inclined pulleys, so that the bias due to the belt rewinding is suppressed, which allows the belt to advance smoothly.

An object of the present invention is to provide a belt junction conveyor in which a junction belt is disposed in an inclined manner to have a predetermined degree of 90 or less to a confluence of a carrier line when viewed from the plane, in which a pair of upper and lower inclined pulleys are arranged adjacent to the above disposed part, and both end pulleys are mounted on a position in such a manner to have a distance from each other to sustain a double angle of the above predetermined angle at the disposed side so that the advancing side belt and returning side belt are rewound by the upper and lower inclined pulleys, respectively, so as to travel toward each of the above end pulleys, said belt junction conveyor comprising a semicircular convex part or a roundish thick periphery formed at both edges of a belt front surface or a back surface; and a holder unit arranged at several locations adjacent to the edge of the traveling belt in such a manner to elastically come into contact with the above semicircular convex part or the thick periphery so as to suppress the meandering tendency resulting from rewinding a belt.

The above holder unit comprises a first guide wheel inclined to come into contact with a semicircular convex part or a roundish thick periphery formed at both edges of a belt front surface or a back surface; and a second guide wheel mounted on the position opposite to the first guide wheel so as to interpose a belt therebetween, said holder unit is provided at a right edge of the front surface in the traveling direction of an advancing side belt immediately before the aforementioned upper inclined pulley, at a left edge of a rewound belt traveling between the upper inclined pulley and a first end pulley, and at a right edge of the back surface in the traveling direction of a returning side belt traveling to a second end pulley side after it has been rewound by the lower inclined pulley.

A first guide wheel of the holder unit is supported by a spring plate having a rubber cushion while a second guide wheel is supported by a spring plate fixed to a bracket. A guide wheel of the holder unit is formed as a rolling bearing in which a rubber bush or rubber spacer is engaged with the inner race thereof so as to be bolt-jointed to the spring plate.

As explained above, in a belt junction conveyor of the present invention a rollback part is formed as an upper and lower inclined pulleys having a predetermined angle to a carrier line, and a holder unit controls a belt profile that is a semicircular convex part or a roundish thick periphery, so that the traveling load is reduced and, therefore, motor capacity is decreased (for example, 4.8 A according to the inventive compared with 12.0 A in a conventional type, which results in 40% decrease). Furthermore, a holder unit suppresses vibration or ruffle movement in the belt cross direction resulting when a belt is rewound by an inclined pulley that is a rotator. Thereby, the belt junction conveyor of the invention reduces meandering and vibration of a belt, or noise. In addition, since a holder unit is formed as a wheel for pressing a convex part of a belt (spring guide wheel), a belt is supported by a fixed suppressing force, so that a belt can travel correcting bias due to the belt rewinding, and eliminating possible belt damage.

According to the present invention, there is provided a belt junction conveyor in which a junction belt is disposed in an inclined manner to have a predetermined degree of 90 or less to a confluence of a carrier line when viewed from the plane, in which a pair of upper and lower inclined pulleys are arranged adjacent to the disposed part, and both end pulleys are mounted on a position where a double angle of the predetermined angle is maintained while keeping a distance from each other at the disposed side so that an advancing side belt and a returning side belt, respectively, are rewound by the upper and lower inclined pulleys to travel toward the above end pulleys, said belt junction conveyor comprising a roundish thick periphery (convex part) formed at both edges in the cross direction of the belt front surface and the back surface; and a holder unit arranged at several locations of the right or left edge of the advancing side belt or returning side belt for elastically sustaining the thick periphery so that the meandering tendency occurring when a belt is rewound by the upper and lower inclined pulleys can be suppressed. The disposed angle maybe 90 degrees or less, preferably, between 60° and 30°, typically 45° is employed. Furthermore, while a semicircular convex part or a roundish thick periphery is formed at both edges of a belt front surface or a back surface, a holder unit is provided at several locations adjacent to the edge of the traveling belt in such a manner to elastically come into contact with the above semicircular convex part or the thick periphery so that the meandering tendency resulting from a belt rewinding is suppressed.

As explained previously, since a belt rewinding part is formed with a rotator (upper and lower inclined pulleys), it is possible to reduce the traveling load, to decrease a motor capacity, to suppress vibration and noise. In addition, since an edge (a semicircular convex part or a roundish thick periphery) of a belt controlled by a holder (a guide holder), a belt meandering more frequently happening in an inclined roller system compared with a conventional belt rewinding part using a slide guide is effectively suppressed, so that the maintenance performance is greatly improved.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
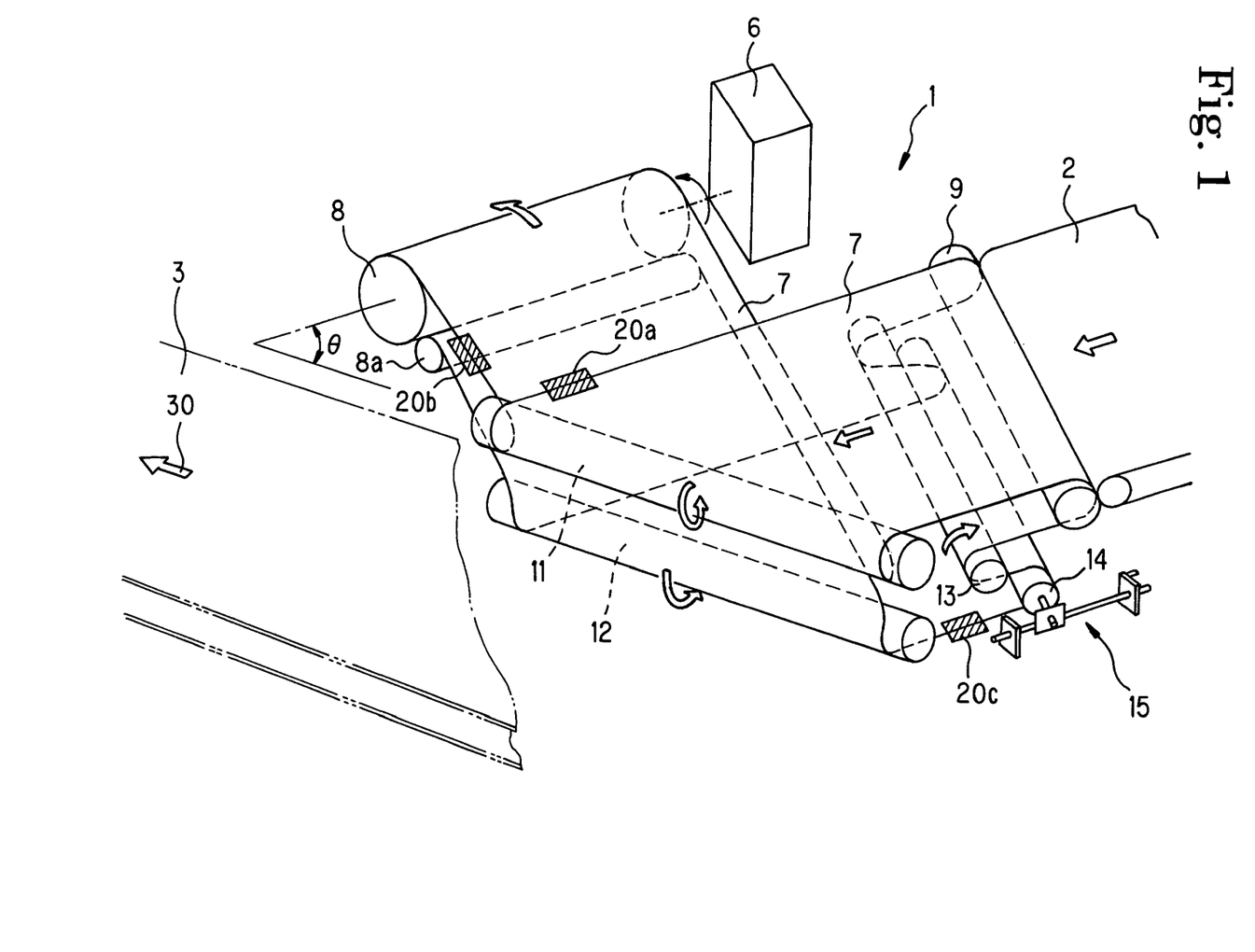
FIG. 1 is a schematic perspective view of an embodiment of a belt junction conveyor of the present invention.

Hereinafter, the preferred embodiments of the invention are explained by referring to drawings. FIG. 1 is a schematic perspective view of a belt junction conveyor 1 of the present invention. A junction belt 7 (hereinafter, referred to a resin belt or a belt) is disposed in an inclined manner to have a predetermined degree of 90 or less to a confluence of a carrier line 3 when viewed from the plane, in which a pair of upper and lower inclined pulleys 11, 12 are arranged adjacent to the disposed part, and both end pulleys 8, 9 are mounted on a position where a double angle of the predetermined angle is maintained while keeping a distance from each other at the disposed side, so that each advancing side belt and returning side belt 7 is rewound by the upper and lower inclined pulleys 11, 12 to travel toward each of the end pulleys 8, 9. In this embodiment, a disposed angle is θ=45° so that both end pulleys 8, 9 are 2θ=90°, that is, the end pulleys 8, 9 are arranged at a position to be opposite to each other to have distance therebetween. One end pulley 8 is a driving pulley while the other end pulley 9 is a driven pulley, both pulleys arranged adjacent to the tip of an upstream feeding conveyor 2. A shaft of the end pulley 8 is connected to a driving unit 6 composed of a motor and a reduction gears.

There is provided a semicircular convex part or a roundish thick periphery 7a (FIGS. 6, 7) at both edges in the cross direction of front surface or back surface of the resin belt 7. Since the semicircular convex part or the roundish thick periphery 7a is interposed and supported by spring type holder units 20a, 20b, and 20c provided at several locations adjacent to outer periphery of the traveling belt 7, the belt can travel in such a manner to maintain tension so that movement/ deviation toward the bias direction caused by being rewound by the inclined pulleys 11, 12 is effectively prevented.

Figure 2:
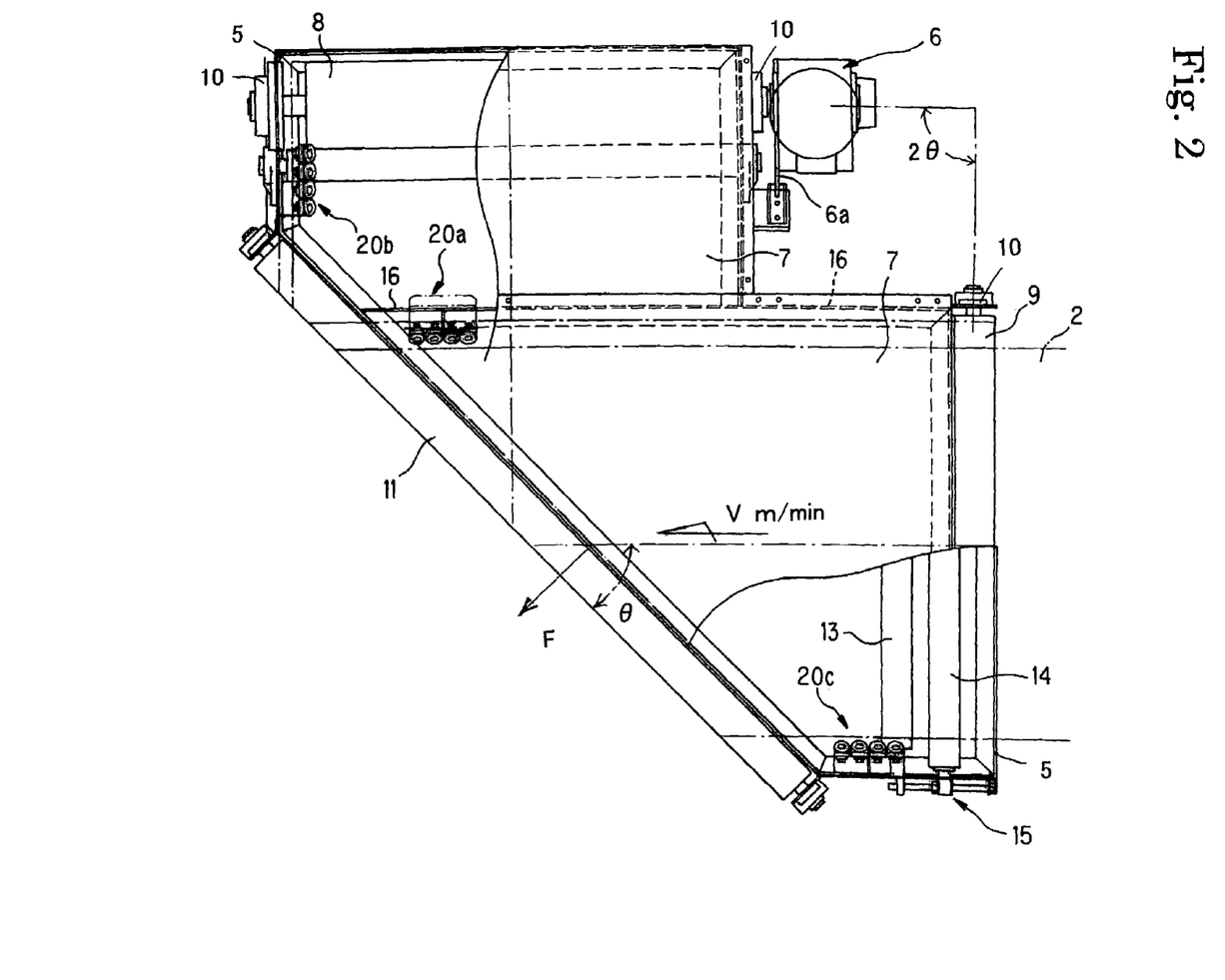
FIG. 2 is a plan view of an embodiment of a belt junction conveyor of the present invention.
Figure 3:
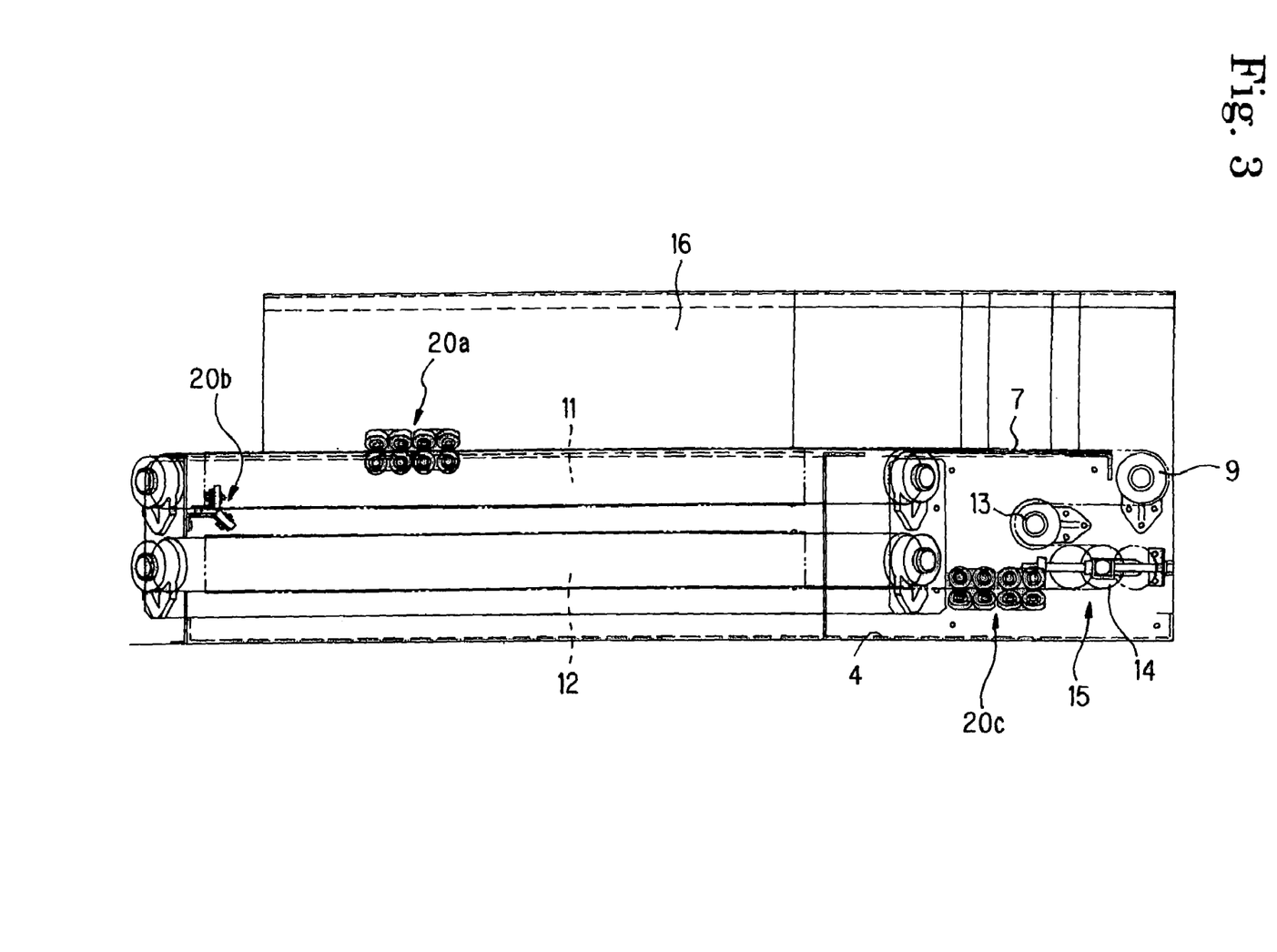
FIG. 3 is a front view of the embodiment shown in FIG. 1.
Figure 4:
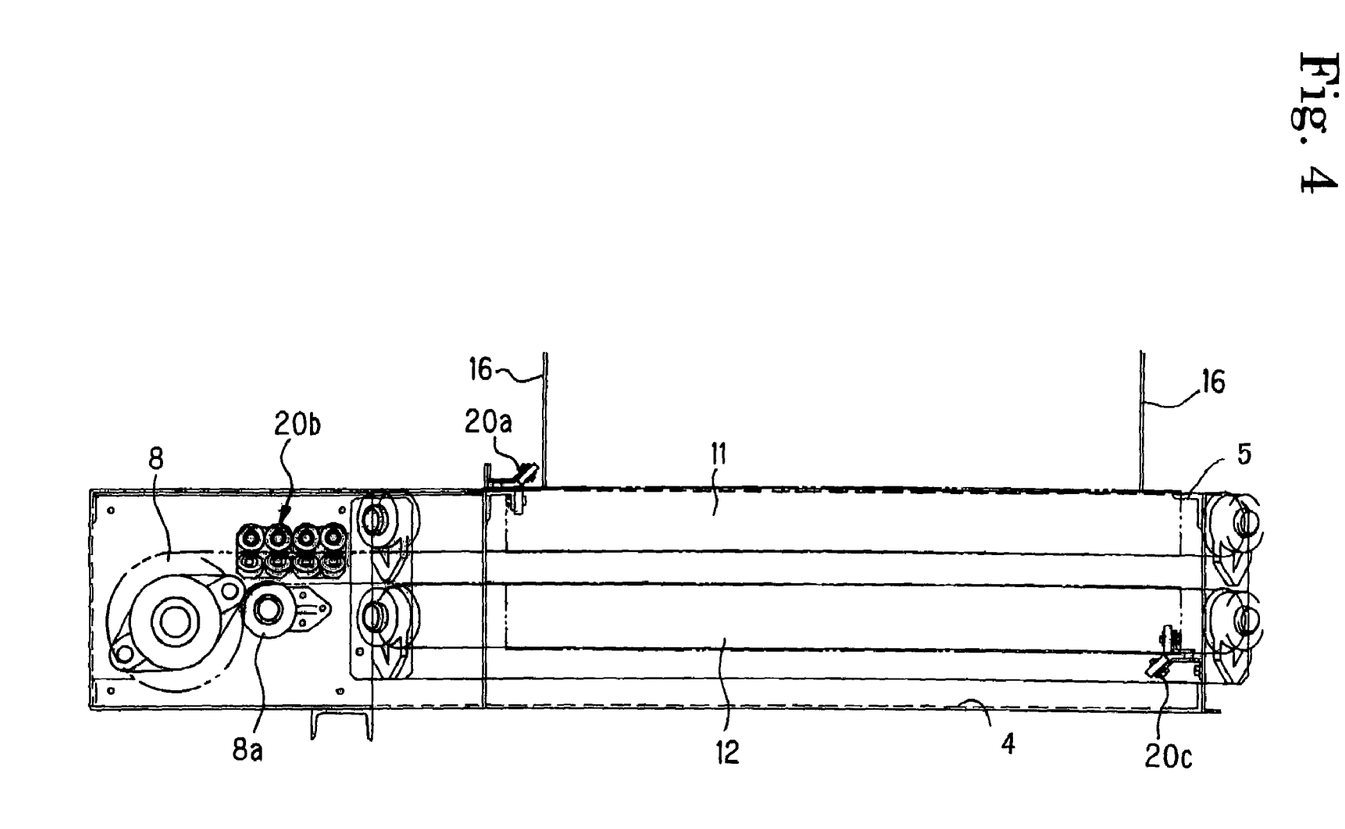
FIG. 4 is a left side view of the embodiment shown in FIG. 1.
Figure 5:
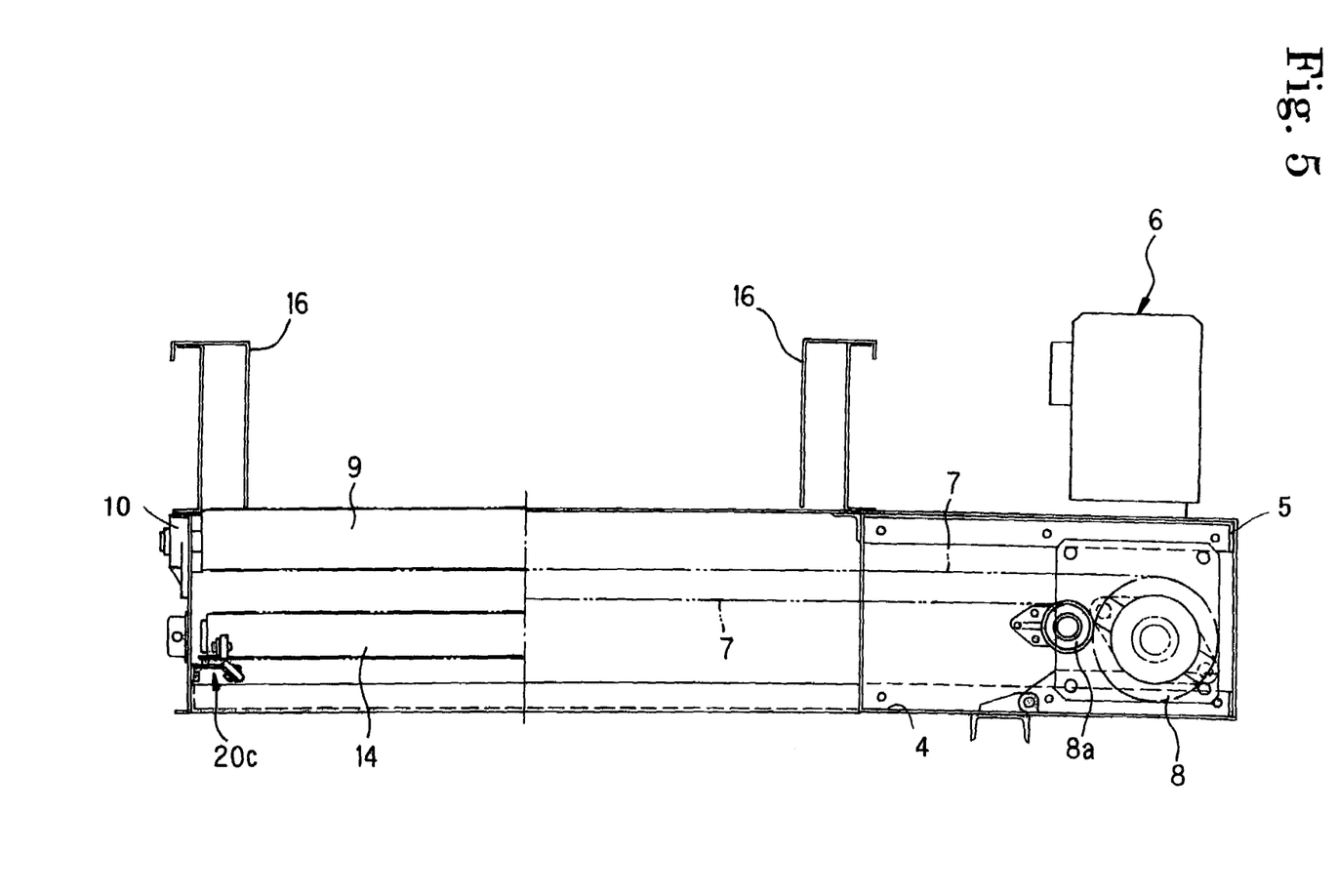
FIG. 5 is a right side view of the embodiment shown in FIG. 1.

FIG. 2 is a plan view of a belt junction conveyor of the present invention, FIG. 3 is a front view of the embodiment, FIG. 4 is a left side view thereof, and FIG. 5 is a right side view thereof, respectively. A belt junction conveyor 1 comprises a bed 4; a frame 5 assembled on the bed 4 in such a manner to have sides in which a pair of sides are opposite to each other and have sides inclined at 45 degrees viewed from the plane; and bearings 10, 10 provided at predetermined locations so as to support the end pulleys 8, 9 at the opposite positions, and to support the upper and lower inclined pulleys 11, 12 at the position inclined at 45 degrees. A snap pulley 8a (FIG. 4) is provided at the side of the end pulley 8 in such a manner to snap the belt 7 immediately after take-up and being fed, while a take-up unit 15 (FIG. 3) is provided at the side of the end pulley 9 on which a take-up pulley 14 is mounted in a free movable manner. A guide plate 16, 16 is provided at the upper part of the frame between an end of the upper inclined pulley 11 and the end pulleys 8, 9 so as to prevent carrying items from falling. A driving unit 6 of the end pulley 8 includes a torque arm 6a for supporting reaction force (FIG. 2).

When a belt rewinds in this conveyor, a driving force F (FIG. 2) to the opposite direction of an inclined angle is produced in the tangential direction of a roller periphery by inclined rollers 11, 12. Since the driving force F is then transmitted to the back surface of the rewinding belt, the belt tends to deviate along with the inclined angle of the inclined roller. Thus, holder units 20*a*, 20*b*, and 20*c* are provided as a means for preventing the belt from moving toward bias direction. As illustrated in FIGS. 1 to 5, the holder units are provided at three locations adjacent to the outer periphery of the traveling belt 7. That is, a first holder unit 20*a* is mounted on the right edge of an advancing side belt immediately before an upper inclined pulley 11, a second holder unit 20*b* mounted on the left edge of a rewinding belt traveling between the upper inclined pulley 11 and the first end pulley 8, and a third holder unit 20*c* mounted on the right edge of a returning belt traveling to the second end pulley 9 side after rewinding at the lower inclined pulley 12, respectively.

Figure 6:
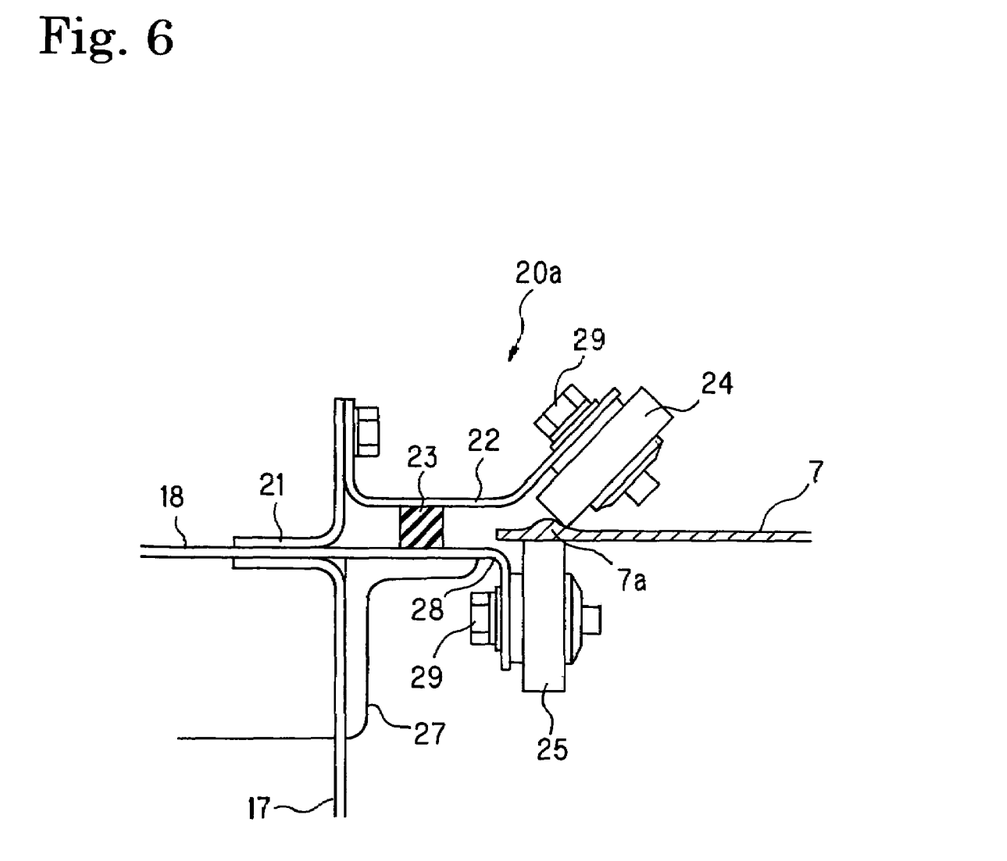
FIG. 6 is an enlarged front view of a guide wheel arranged at a belt advancing side.

As illustrated in FIG. 6, the first holder unit 20 comprises a guide wheel 24 inclined in such a manner to come into contact with a semicircular convex part or a roundish thick periphery 7*a* at an angle, and a vertical guide wheel 25 connecting to the edge of a belt back surface opposed to the thick periphery 7*a*. The guide wheels in this embodiment are formed in a shape of rolling bearing. An angle member 21 is fixed to a frame top plate 19 of the guide wheel mounting position, said angle member 21 is then fixed to a spring plate 22 of a channel shape having one edge open at an obtuse angle in which a shoulder bolt 29 penetrated at the position adjacent to its tip so as to mount the inclined guide wheel 24. In the meantime, an angle member 27 having an angled plate spring 28 is fixed to a frame side plate 17, while a rubber cushion 23 elastically connected to the lower surface of the spring plate 22 is fixed to the upper surface of a level flange of the angled plate spring 28. Then, a shoulder bolt 29 penetrates at the position adjacent to the tip of the spring plate 22 so as to mount the vertical guide wheel 25.

Figure 7:
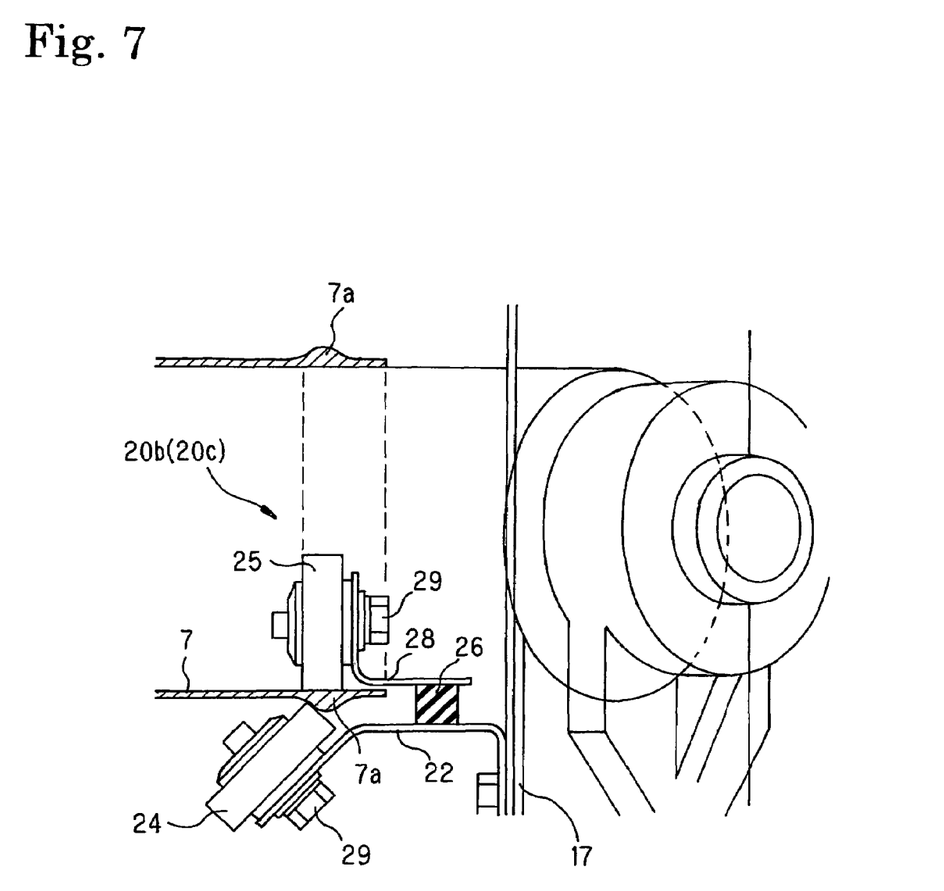
FIG. 7 is an enlarged front view of a guide wheel arranged at a belt returning side.

FIG. 7 is an enlarged front view illustrating the status where the second and third holder units 20*b* and 20*c* are mounted. A spring plate 22 of a channel shape having one edge open at obtuse angle is fixed to a frame side plate 17 of the guide wheel mounting position, while a sheet angle 28 is provided at the upper surface of the spring plate 22 through a rubber cushion 26 elastically connected to the lower surface of the spring plate 22. Then, a shoulder bolt 29 penetrates this so as to mount the vertical guide wheel 25.

Figure 8:
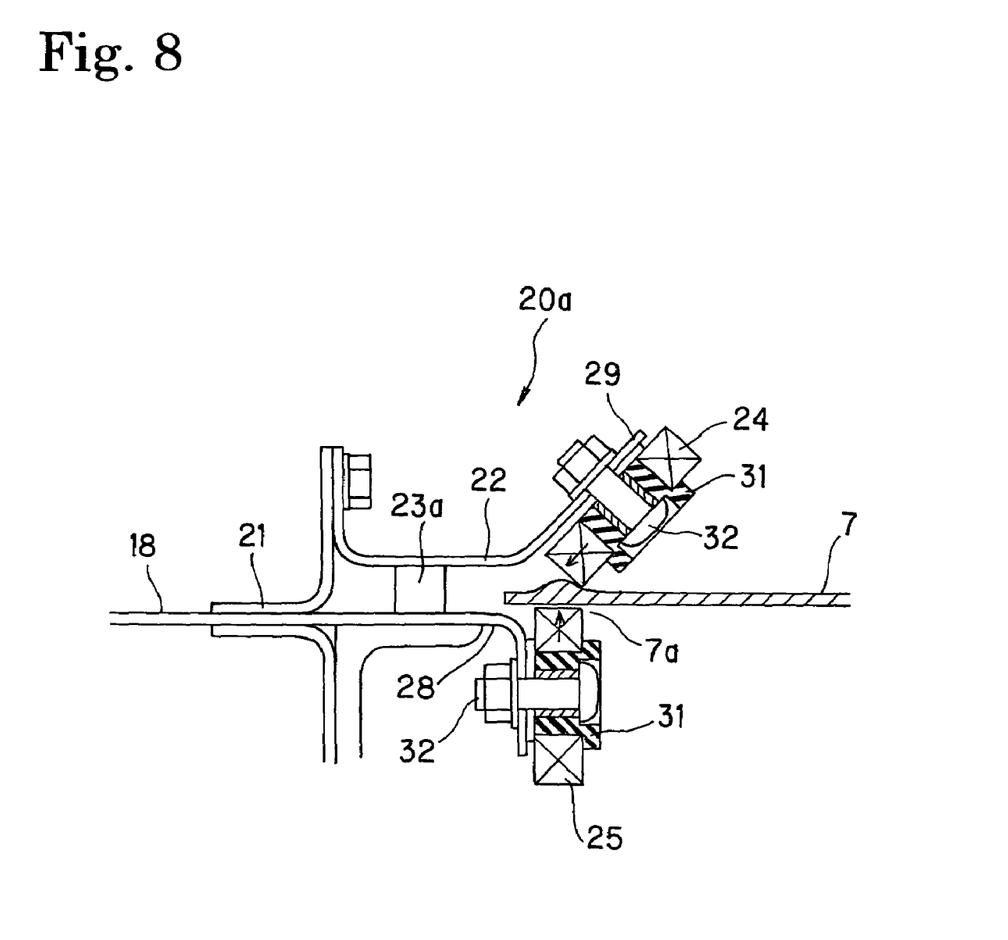
FIG. 8 is an enlarged front view illustrating an alternative embodiment of a guide wheel supporting method.

FIG. 8 illustrates an alternative embodiment of a guide wheel in which a guide wheel 24, 25 of a holder unit is fixed to a spring plate 22, 28, respectively, by penetrating a bolt 32 in such a manner to engage a rubber bush or a rubber spacer 31 with an inner race of a rolling bearing. In other words, since the periphery of each wheel is constantly biased to the radial, that is, the direction indicated by an arrow in FIG. 8 by the spring of the rubber bush or the rubber spacer 31 engaged with the outer periphery of the bolt 32 of each wheel, the tension of the sectoral belt in the outer periphery direction is sustained in such a manner to press down a profile (a thick periphery of a belt) 7*a*. Furthermore, since each wheel presses down the profile on a flat periphery, and the edge of the wheel periphery does not come into contact with the belt surface, there is no risk for the belt to get damaged. In FIG. 8, the reference numeral 23*a* depicts a spacer made of metal or rubber.

As explained above, a first holder unit 20*a* is provided at a right edge of an advancing side belt immediately before an upper inclined pulley, a second holder unit 20*b* being provided at a left edge of a rewinding belt traveling between the upper inclined pulley and a first end pulley directly connected to a driving unit 65 and a third holder unit 20*c* being provided at a right edge of a returning side belt traveling to a second end pulley 9 side after it has been rewound by a lower inclined pulley 12. As a result, the edges of the traveling belt are elastically sustained so as to suppress the direct advance tendency remaining when the belt is rewound by the upper and lower inclined pulleys 11, 12, so that the meandering tendency that occurs when the belt 7 is rewound is effectively suppressed. Although there is a clearance between the belt 7 and a peripheral cover (not shown), catch prevention is implemented in such a manner that a guide plate 16 is provided at a position to have a predetermined distance from the belt edges, so that a tag is prevented from falling into the clearance resulting in catching and causing damage.

What is claimed is:

1. A belt junction conveyor in which a junction belt is disposed in an inclined manner to have a predetermined degree of 90 or less to a confluence of a carrier line when viewed from the plane, in which a pair of upper and lower inclined pulleys are arranged adjacent to the disposed part, and both end pulleys are mounted on a position where a double angle of the predetermined angle is maintained while keeping distance from each other at the disposed side so that an advancing side belt and a returning side belt, respectively, are rewound by the upper and lower inclined pulleys which travel toward each of said end pulleys, comprising:

a semicircular convex part or a roundish thick periphery is formed at both edges in the cross direction of a belt front surface or a back surface; and a holder unit arranged at several locations adjacent to the edge of a traveling belt in such a manner to elastically come into contact with the above semicircular convex part or the thick periphery so that the meandering tendency resulting from a belt rewinding is suppressed.

2. The belt junction conveyer defined in claim 1, wherein said holder unit includes a first guide wheel inclined to come into contact with a semicircular convex part or a roundish thick periphery formed at both edges of a belt front surface or a belt back surface; and a second guide wheel mounted on the position opposite to the first guide wheel so as to interpose a belt therebetween, said holder unit is provided at a right edge of the front surface in a traveling direction of an advancing side belt immediately before an upper inclined pulley, at a left edge of a rewound belt traveling between the upper inclined pulley and a first end pulley, and at a right edge of the back surface in a traveling direction of a returning side belt traveling to a second end pulley side after it has been rewound by a lower inclined pulley.

3. The belt junction conveyer defined in claim 1 or 2, wherein said first guide wheel of the holder unit is supported by a spring plate having a rubber cushion while the second guide wheel is supported by a spring plate fixed to a bracket.

4. The belt junction conveyer defined in claim 1 or 2, wherein said guide wheel of the holder unit is formed as a rolling bearing in which a rubber bush or rubber spacer is engaged with the inner race thereof so as to be bolt-jointed to the spring plate.

\* \* \* \* \*